(12) United States Patent
Zhu et al.

(10) Patent No.: US 9,633,283 B1
(45) Date of Patent: Apr. 25, 2017

(54) ADAPTIVE DEVICE AND ADAPTIVE METHOD FOR CLASSIFYING OBJECTS WITH PARALLEL ARCHITECTURE

(71) Applicant: Automotive Research & Test Center, Changhua County (TW)

(72) Inventors: Zhen-Wei Zhu, Changhua County (TW); Chang-Kun Yao, Changhua County (TW)

(73) Assignee: Automotive Research & Test Center, Lugang, Changhua County (TW)

( * ) Notice: Subject to any disclaimer, the term of this patent is extended or adjusted under 35 U.S.C. 154(b) by 0 days.

(21) Appl. No.: 14/980,308

(22) Filed: Dec. 28, 2015

(51) Int. Cl.
*G06K 9/00* (2006.01)
*G06K 9/62* (2006.01)
*G06K 9/46* (2006.01)
*G06T 1/20* (2006.01)

(52) U.S. Cl.
CPC ......... *G06K 9/6285* (2013.01); *G06K 9/4642* (2013.01); *G06K 9/627* (2013.01); *G06K 9/6298* (2013.01); *G06T 1/20* (2013.01)

(58) Field of Classification Search
CPC ....... G06K 9/00536; G06K 9/00362–9/00369; G06K 9/00624–9/00845; G06K 9/46–9/527; G06K 9/6212; G06K 9/6267–9/6293; G06K 9/6298–9/64; G06K 2017/0077; G06T 1/20; G06T 7/004–7/0048; G06T 2207/30196; G06T 2207/30236; G06T 2207/30248–2207/30252; G06T 7/70–7/77; H04N 5/23219; G06F 17/30793; G08G 1/16–1/168; B60W 30/08; B60R 21/01; B60R 2021/01006–2021/01013; B60R 21/013; G01S 13/93; G01S 13/931
See application file for complete search history.

(56) References Cited

U.S. PATENT DOCUMENTS

| 8,401,243 | B2* | 3/2013 | Komoto | G06T 7/2033 382/107 |
| 9,199,641 | B2* | 12/2015 | Ferguson | G01C 21/3461 |
| 9,221,396 | B1* | 12/2015 | Zhu | G01S 17/023 |
| 9,236,090 | B2* | 1/2016 | Nobori | G11B 27/031 |

(Continued)

*Primary Examiner* — Jose Couso
(74) *Attorney, Agent, or Firm* — Muncy, Geissler, Olds & Lowe, P.C.

(57) ABSTRACT

An adaptive device and an adaptive method for classifying objects with parallel architecture are provided. The method stores a plurality of scene parameters and a plurality of classifier parameters. The method retrieves at least one image datum and then drags frames to enclose a plurality of obstruction images of the image datum and decides a frame range according to a range of each obstruction image. The method uses a plurality of image processing units to respectively calculate a plurality of obstruction characteristic data of the obstruction images in a one-by-one parallel processing way, and chooses and calculates the scene parameters and the classifier parameters corresponding to the obstruction characteristic data to obtain a plurality of classification data. When the method determines that the classification data belongs to the obstruction classification preset, positions of enclosed obstruction images are outputted to achieve real time detection for obstructions.

13 Claims, 7 Drawing Sheets

(56) References Cited

U.S. PATENT DOCUMENTS

| | | | |
|---|---|---|---|
| 9,349,070 B2 * | 5/2016 | Kasaoki | G06K 9/00805 |
| 2012/0134586 A1 | 5/2012 | Pajaniradja et al. | |
| 2014/0029852 A1 * | 1/2014 | Pisipati | G06T 7/0042 |
| | | | 382/182 |

* cited by examiner

ADAPTIVE DEVICE AND ADAPTIVE METHOD FOR CLASSIFYING OBJECTS WITH PARALLEL ARCHITECTURE

BACKGROUND OF THE INVENTION

Field of the Invention

The present invention relates to an adaptive device and an adaptive method for classifying objects, particularly to an adaptive device and an adaptive method for classifying objects with parallel architecture.

Description of the Related Art

In recent years, driving safety is more concerned. With the decreased cost of image equipments and development of image recognition, an image recognition system has more widely applied to driving safety. Besides, an image recognition technology is an important method to reduce the cost of a safe system. Statistically, as long as a driver is warned 0.5 second before collisions, rear-end collision accidents with a percentage of at least 60%, head-on collision accidents with a percentage of 30% and road-related accidents with a percentage of 50% are avoided. If the warning time is 1 second, the accidents with 90% are avoided. It is difficult for the image recognition system to calculate a large of data amount. How to deal with a large of data amount in a vehicle safe system requiring strictly performing real time operations is more concerned.

A pedestrian detection system used in an automatic emergency braking (AEB) system is realized with very expensive equipment, such as an infrared ray detection device or a laser radar detection device. Road scenes are complicated. For example, a scene has pedestrians, vehicles, cats and dogs. As a result, the stronger characteristic parameters are needed to separate the pedestrians from the other backgrounds. Additionally, during a detection process of the pedestrian detection system, the precision of detection results is decreased due to the disturbances of various environment factors of sets. For example, the environment with uneven illumination makes a part of the pedestrians too bright or too dark. Alternatively, it is often not accurate to determine whether a pedestrian exists in a scene under a condition of a body of the pedestrian partially shielded. There is another pedestrian detection method which uses a background-retrieving technology to obtain foregrounds for further processing. However, the foregrounds are more broken whereby the rear end is difficult to recognize them. Besides, the technology costs a lot of time to retrieve images, which imposes a burden on the system. As a result, how to improve the efficiency of detecting obstructions and to achieve real time detection requirements is a problem to be solved.

To overcome the abovementioned problems, the present invention provides an adaptive device and an adaptive method for classifying objects with parallel architecture, so as to solve the afore-mentioned problems of the prior art.

SUMMARY OF THE INVENTION

A primary objective of the present invention is to provide an adaptive device and an adaptive method for classifying objects with parallel architecture, which parallelly processes several obstruction images to improve the efficiency of processing images, thereby simplifying the complexity of processing images and time-consuming problems.

Another objective of the present invention is to provide an adaptive device and an adaptive method for classifying objects with parallel architecture, which determines the scene corresponding to the images retrieved, flexibly adjusts classifier parameters in response to various scenes, and determines obstruction images with higher precision and classification thereof to solve the problem with misjudgment of a detection system in the traditional technology.

Further objective of the present invention is to provide an adaptive device and an adaptive method for classifying objects with parallel architecture, which drags frames to enclose obstruction images and decides the range of the frames, and then processes the images according to the distances that the images are retrieved and sizes of the obstruction images, thereby improving the efficiency of processing images.

Yet another objective of the present invention is to provide an adaptive device and an adaptive method for classifying objects with parallel architecture, which are embedded in an automatic emergency braking (AEB) system of a vehicle to achieve real time detection.

To achieve the abovementioned objectives, the present invention provides an adaptive method for classifying objects with parallel architecture storing a plurality of scene parameters and a plurality of classifier parameters. the adaptive method for classifying objects with parallel architecture comprises steps of: retrieving at least one image datum; dragging frames to enclose a plurality of obstruction images of the image datum and deciding a frame range according to a range of each obstruction image; using a plurality of image processing units to respectively calculate a plurality of obstruction characteristic data of the obstruction images, and choosing and calculating the scene parameters and the classifier parameters corresponding to the obstruction characteristic data to obtain a plurality of classification data, the classifier parameters comprise a plurality of oriented gradient characteristic parameters of different obstruction classification, and wherein each classification datum is obtained by adding up each obstruction characteristic datum multiplied by the corresponding classifier parameter; and determining whether the classification data is larger than a floating threshold corresponding to obstruction classification: if yes, determining that the classification data belongs to the obstruction classification and outputting positions of enclosed the obstruction images; and if no, determining that the classification data does not belong to the obstruction classification. The present invention not only parallelly processes the obstruction images to efficiently reduce operation time and to achieve real time detection, but also determines the scene corresponding to the image data. The present invention adaptively adjusts the classifier parameters according to the scene parameters, calculates the obstruction characteristic data to obtain more reliable classification data, greatly improves overall detection precision, and has market competitiveness.

Wherein, the method further comprises a step of choosing a region of interest on the image datum and then dragging the frames to enclose the obstruction images in the region of interest on the image datum before the step of dragging the frames to enclose the obstruction images. Taking consideration of the depth and sizes of the obstruction images of the image datum, the method comprises a step of adjusting the frame range of each obstruction image after the step of dragging the frames to enclose the obstruction images.

Wherein, a histogram of oriented gradient (HOG) algorithm calculates edge values of each obstruction image, divides each obstruction image into a plurality of small blocks, and then calculates and adds up orientations and edge parameters of each pixel of each small block to obtain nine characteristic vectors, and perform statistics on nine characteristic vectors in each small block, thereby obtaining the obstruction characteristic data of the obstruction images.

The present invention also provides an adaptive device for classifying objects with parallel architecture storing a plurality of scene parameters and a plurality of classifier parameters, and the adaptive device for classifying objects with parallel architecture comprises at least one image retriever and an image processor. The image retriever retrieves at least one image datum, drags frames to enclose a plurality of obstruction images of the image datum and decides a frame range according to a range of each obstruction image. The image processor is electrically connected with the image retriever, and the image processor comprises a plurality of image processing units. The image processing units respectively calculate a plurality of obstruction characteristic data of the obstruction images, choose and calculate the scene parameters and the classifier parameters corresponding to the obstruction characteristic data to obtain a plurality of classification data, compare the classification data with a floating threshold corresponding to obstruction classification and output positions of enclosed the obstruction images corresponding to the floating threshold.

Below, the embodiments are described in detail in cooperation with the drawings to make easily understood the technical contents, characteristics and accomplishments of the present invention.

DETAILED DESCRIPTION OF THE INVENTION

In order to make an automatic emergency braking (AEB) system rapidly determine braking timing, the present invention provides an adaptive device and an adaptive method for classifying objects with parallel architecture and a pipeline operation technology to solve the drawback that cannot achieve real time detection in the traditional technology.

Figure 1:
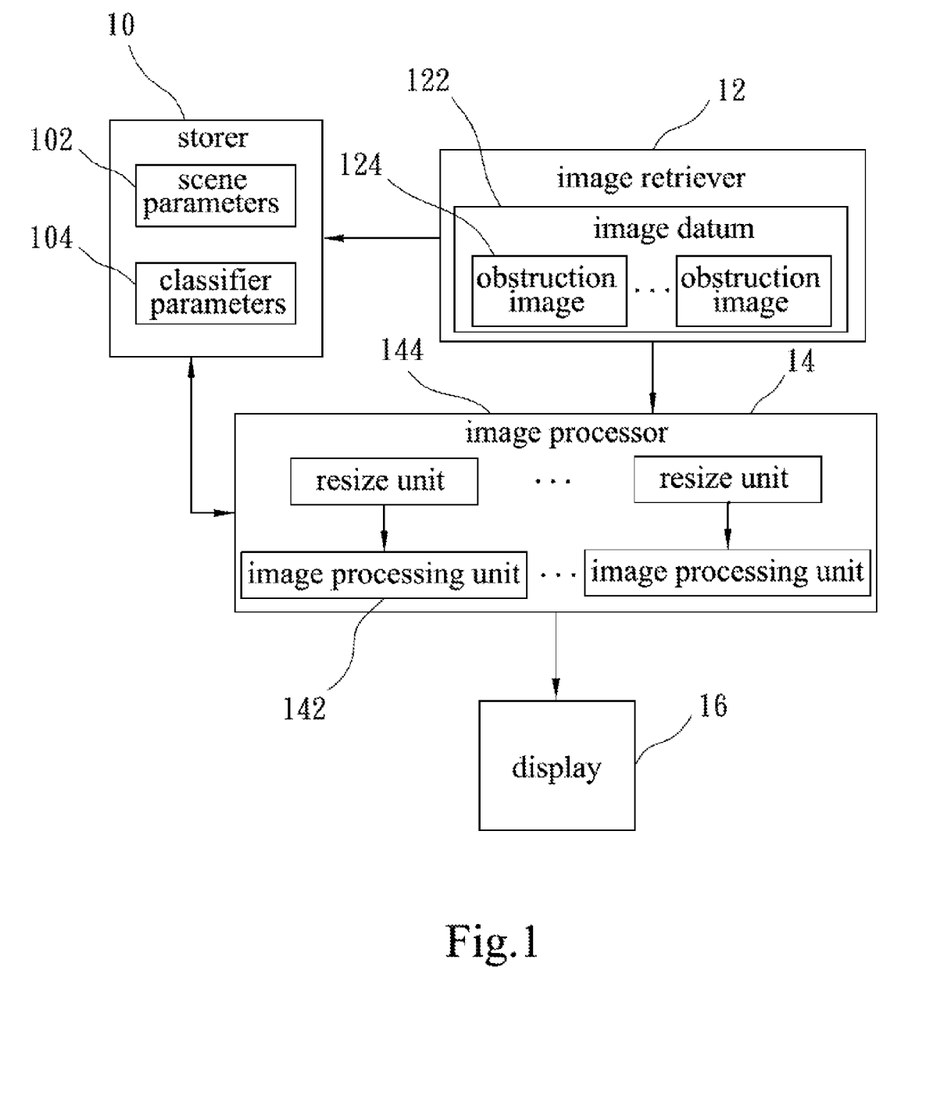
FIG. 1 is a block diagram showing an adaptive device for classifying objects with parallel architecture according to an embodiment of the present invention.

Refer to FIG. 1 which is a block diagram showing an adaptive device for classifying objects with parallel architecture according to an embodiment of the present invention. The adaptive device for classifying objects is built in an automatic emergency braking (AEB) system. The adaptive device for classifying objects comprises a storer 10, at least one image retriever 12 and an image processor 14. The image processor 14 is electrically connected with the storer 10 and the image retriever 12. The storer 10 is a synchronous dynamic random access memory (SDRAM) and stores a plurality of scene parameters 102 and a plurality of classifier parameters 104. The image processor 14 comprises a plurality of image processing units 142 and a plurality of resize units 144. The image processing units 142 are electrically connected with the resize units 144. The image retriever 12 retrieves one image datum 122 and then drags frames to enclose a plurality of obstruction images 124 of the image datum 122 and decides a frame range according to a range of each obstruction image 124. Since the image retriever 12 has an ability to retrieve images at different distances and the ranges of the obstruction images 124 are different, the resize units 144 are used to adaptively adjust the frame range of each obstruction image 124 enclosed to reduce the data amount of images subsequently processed. In order to rapidly improve the efficiency of processing images, the amount of the enclosed obstruction images 124 equals to the amount of the image processing units 142, and the image processing units 142 parallelly process the enclosed obstruction images 124. In other words, the image processing units 142 process the obstruction images 124 in a one-by-one parallel processing way. Thus, the image processing units 142 respectively calculate a plurality of obstruction characteristic data of the obstruction images, choose and calculate the scene parameters 102 and the classifier parameters 104 corresponding to the obstruction characteristic data to obtain a plurality of classification data, compare the classification data with a floating threshold corresponding to obstruction classification and output positions of the enclosed obstruction images 124 corresponding to the floating threshold to a display 16. The present invention parallelly processes several obstruction images 124 to improve the efficiency of processing images, thereby simplifying the complexity of processing images and time-consuming problems.

Figure 2:
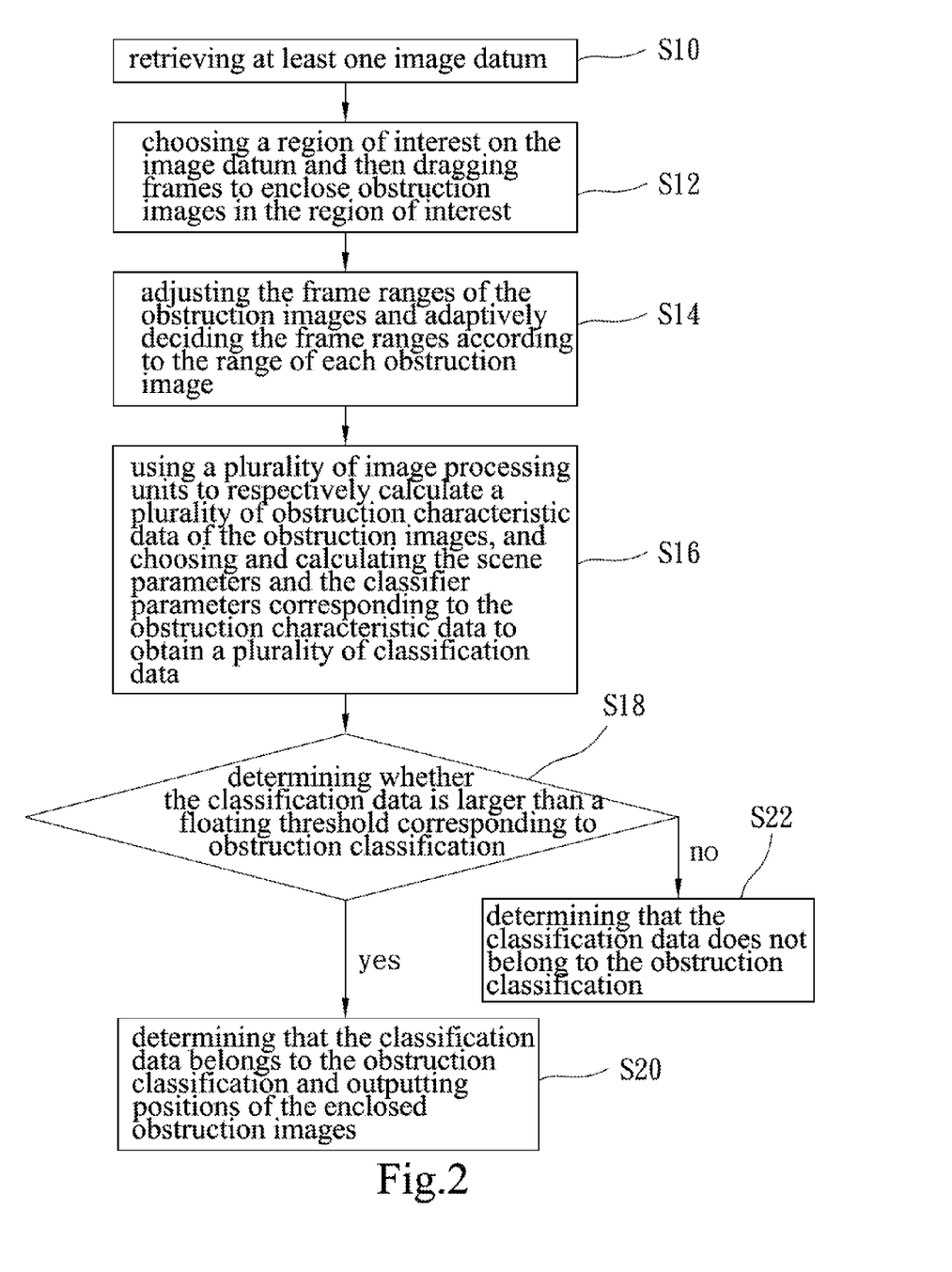
FIG. 2 is a flow chart showing an adaptive method for classifying objects with parallel architecture according to an embodiment of the present invention.
Figure 3:
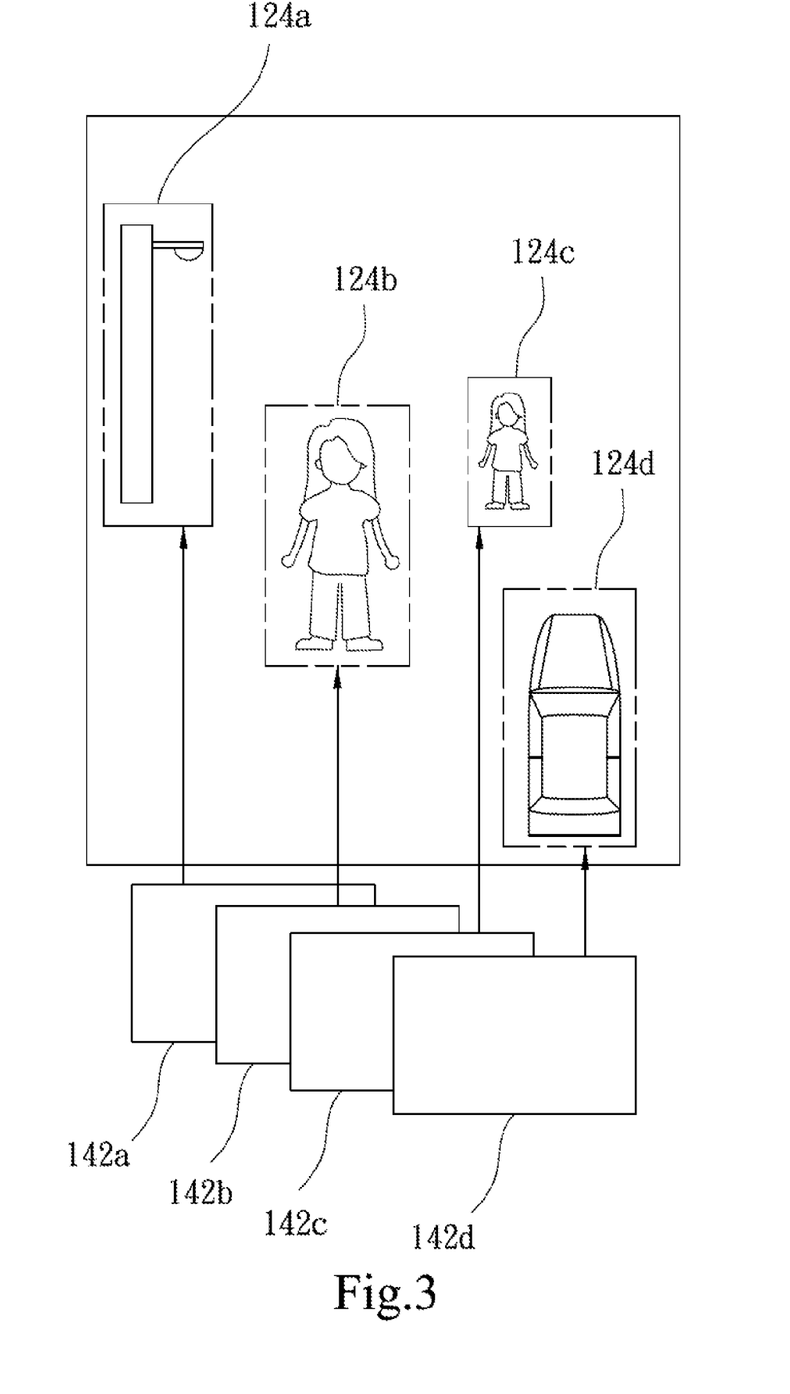
FIG. 3 is a diagram schematically showing frames dragged to enclose obstruction images in parallel according to an embodiment of the present invention.

In order to realize how the present invention uses parallel architecture and a pipeline operation technology to achieve real time detection, refer to FIG. 1, FIG. 2 and FIG. 3. FIG. 2 is a flow chart showing an adaptive method for classifying objects with parallel architecture according to an embodiment of the present invention. FIG. 3 is a diagram schematically showing frames dragged to enclose obstruction images in parallel according to an embodiment of the present invention. Firstly, in Step S10, at least one image datum 122 is retrieved. In the embodiment, take one image datum for example. According to a present dynamic interval of interest in driving, the scanned regions are dynamically adjusted to avoid scanning the image regions that needn't be calculated and to reduce operation amounts. In Step S12, a region of interest (ROI) on the image datum is chosen and then the frames are dragged to enclose the obstruction images in the region of interest on the image datum 122. The obstruction images comprise vehicles, pedestrians, animals, telephone poles, trees, roadblocks or a combination of these. As shown in FIG. 3, the obstruction images comprise obstruction images 124a, 124b, 124c and 124d. In Step S14, the resize units 144 are used to respectively adjust the frame ranges of the obstruction images 124a, 124b, 124c and 124d and to adaptively decide the frame ranges according to the range of each obstruction image 124. Since different obstruction classification has different lengths, widths and heights and the sizes of the images captured varies with different focal distances, the resize units 144 are used to adjust the frame ranges of different obstruction images, thereby increasing the speed of processing images. In Step S16, the image processing units are respectively used to calculate a plurality of obstruction characteristic data of the obstruction images. For example, the image processing unit 142a calculates the obstruction characteristic data of the obstruction image 124a, and the image processing unit 142b calculates the obstruction characteristic data of the obstruction image 124b, and the image processing unit 142c calculates the obstruction characteristic data of the obstruction image 124c, and the image processing unit 142d calculates the obstruction characteristic data of the obstruction image 124*d*. Wherein, the image processing units 142*a*, 142*b*, 142*c* and 142*d* parallelly process the corresponding obstruction images 124*a*, 124*b*, 124*c* and 124*d*, and calculate the scene parameters 102 and the classifier parameters 104 corresponding to the obstruction characteristic data to obtain a plurality of classification data. Wherein, the scene parameters 102 comprise over-exposed scenes, night scenes, sunlit scenes or dusk scenes, and are flexibly adjusted. The classifier parameters 104 comprise a plurality of oriented gradient characteristic parameters of different obstruction classification, and are immediately adjusted according to the obstruction classification. Finally, in Step S18, the process determines whether the classification data is larger than a floating threshold corresponding to obstruction classification. If the answer is yes, Step S20 is performed to determine that the classification data belongs to the obstruction classification and to output positions of the enclosed obstruction images. If the answer is no, Step S22 is performed to determine that the classification data does not belong to the obstruction classification. The obstruction classification belongs to vehicles, pedestrians or roadblocks. The present invention determines the scene corresponding to the images retrieved, flexibly adjusts the classifier parameters 104 in response to various scenes, and determines the obstruction images 124 with higher precision and classification thereof to solve the problem with misjudgment of a detection system in the traditional technology. Besides, the image processing units 142 are built in an AEB system of a vehicle.

In order to describe how the image processing units 142 of the present invention calculate the obstruction characteristic data of the obstruction images and how to choose and calculate the scene parameters and the classifier parameters corresponding to the obstruction characteristic data to obtain the classification data, the obstruction images are exemplified by pedestrian detection images. Refer to FIG. 1 and FIGS. 4A-4D. FIGS. 4A-4D are a flow chart showing detection of obstructions of an image datum according to an embodiment of the present invention. In this embodiment, the present invention uses a histogram of oriented gradient (HOG) algorithm to calculate obstruction characteristic values which are used to perform statistics on the gradient strengths and orientation information of the whole image to serve as a basis for classifying obstructions in the subsequent process. The HOG algorithm has a higher tolerance for the edge enhanced strengths and deformation abilities of the obstructions. Additionally, the stored classifier parameters of the present invention come from a support vector machine (SVM) which uses the inner product of vectors to calculate the characteristic parameters of the obstructions to correspond to a hyperplane whereby the separation of the obstruction characteristic values is largest. Specifically, the SVM uses hundreds of pedestrian samples or thousands of pedestrian samples to build a pedestrian image database. After the obstruction characteristic values are figured out by the HOG algorithm, the obstruction characteristic values are inputted to the SVM for an off-line training. Finally, the classifier parameters of the training results serve as a basis for classifying obstructions in the subsequent process.

Figure 4A:
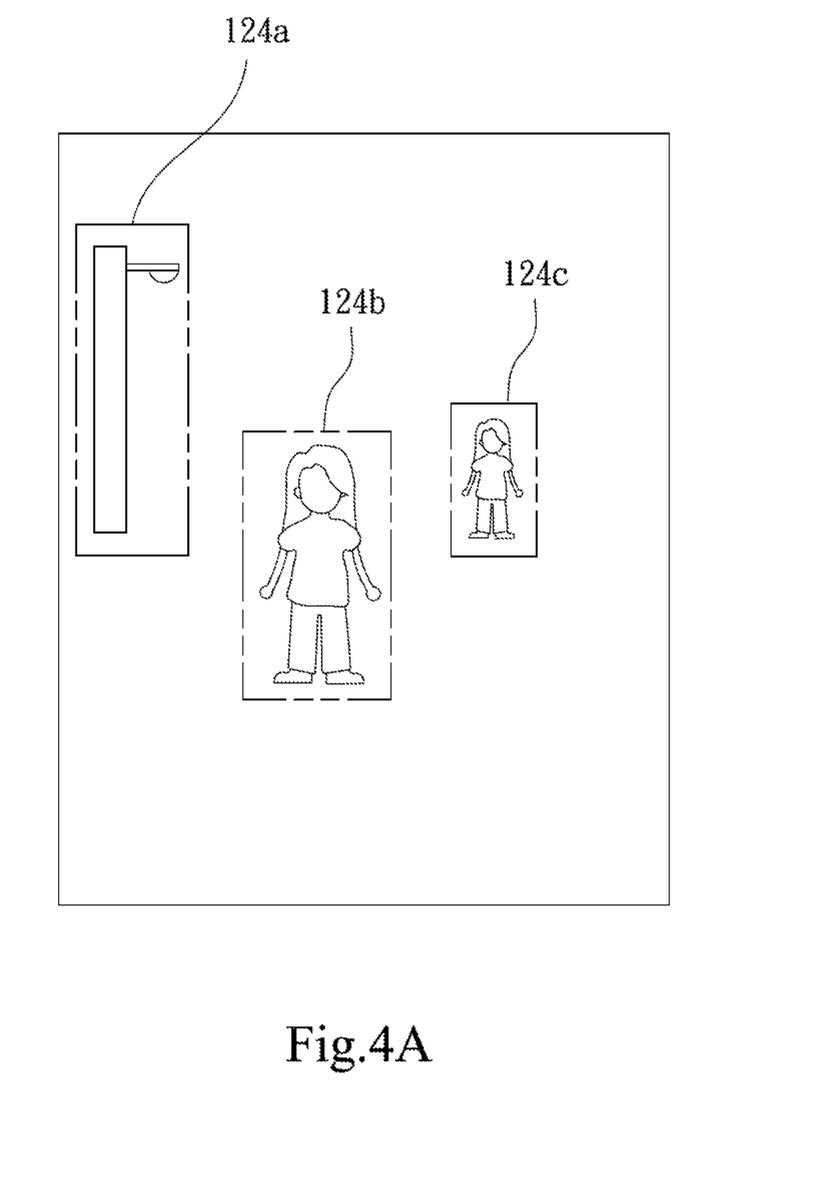
FIGS. 4A-4D are a flow chart showing detection of obstructions of an image datum according to an embodiment of the present invention.
Figure 4B:
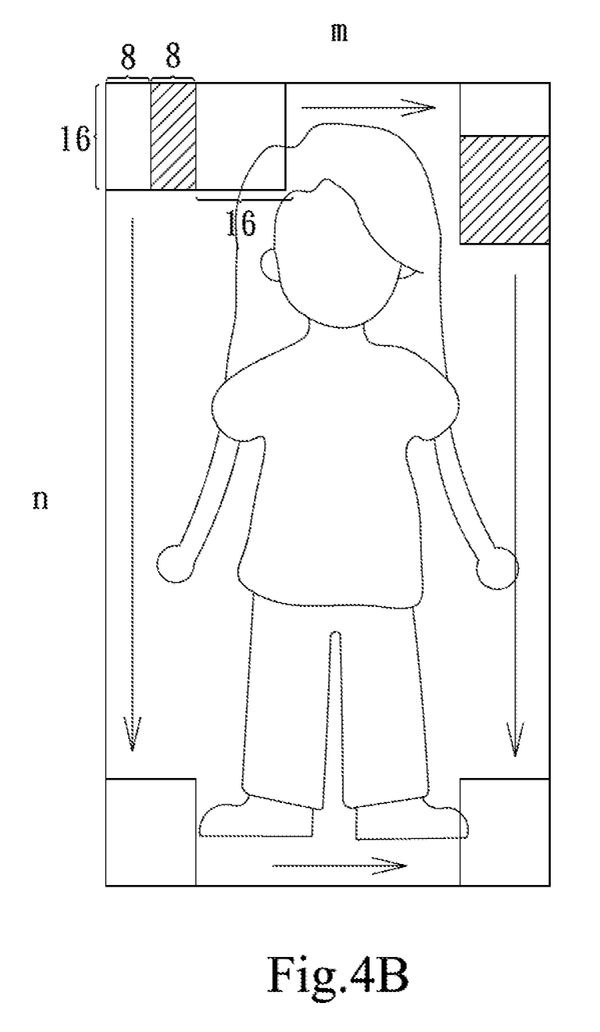
Figure 4C:
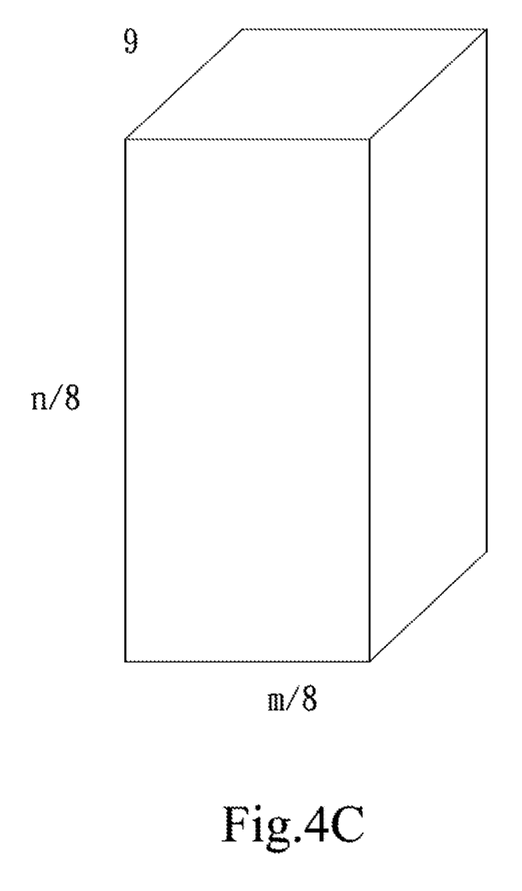

As shown in FIG. 4A, one image datum 122 is retrieved and the frames are dragged to enclose a plurality of obstruction images 124*a*, 124*b* and 124*c* of the image datum 122. Then, as shown in FIG. 4B, each image processing unit 142 uses the HOG algorithm to calculate edge values of each obstruction image and to divide each obstruction image 124 enclosed into a plurality of small blocks. Then, each image processing unit 142 uses the HOG algorithm to calculate and add up orientations and edge parameters of each pixel of each small block, thereby obtaining nine characteristic vectors in each small block. For example, when a pedestrian image as the obstruction image 124 is detected, the obstruction image 124 has a size of 64(n)×128(m). Edge detection is performed on each pixel of the obstruction image 124 to obtain edge orientations and edge strengths of each pixel. Then, the obstruction image 124 is divided into cells having a size of 16×16 and partially overlapping each other, whereby the cells are calculated by the HOG algorithm. Each time the obstruction image 124 moves by 8 grids, the data stream is stored in a static random-access memory (SRAM) in advance in a pipeline design way, so as to reduce data moving time and operation time and increase operation speed. The SRAM is electrically connected with the image processor 14. Due to the fact that the edge orientations different by 180 degrees are viewed as a single orientation, each cell is divided into nine characteristic vectors based on the edge orientations of 0~180 degrees. In other words, every 16×16 pieces of blocks corresponds to nine orientations. As shown in FIG. 4C, the total amount of data contains 9×(n/8)×(m/8) pieces of obstruction characteristic data in this stage. All the pixels of each cell respectively vote for its characteristic vectors to perform statistics, and the votes represent the edge strengths of the pixels. The information of the nine orientations is denoted by a nine dimension vector, namely nine characteristic vectors. The four neighboring cells are viewed as a block, and different blocks can overlap each other. The characteristic vectors of the four cells in the block represent local edge information of the position of the obstruction image 124. With parallel operations, the four cells are calculated at the same time and stored in the SRAM to perform statistics, thereby increasing the overall operation speed. Finally, the pedestrian image is represented by a 36 dimension vector. The 36 dimension vector is normalized to have a length of 1. The 36 dimension vectors of 7×15 pieces of blocks are combined to obtain a 3780 dimension vector including overall and local information of pedestrians, namely the obstruction characteristic data of the obstruction image 124.

Figure 4D:
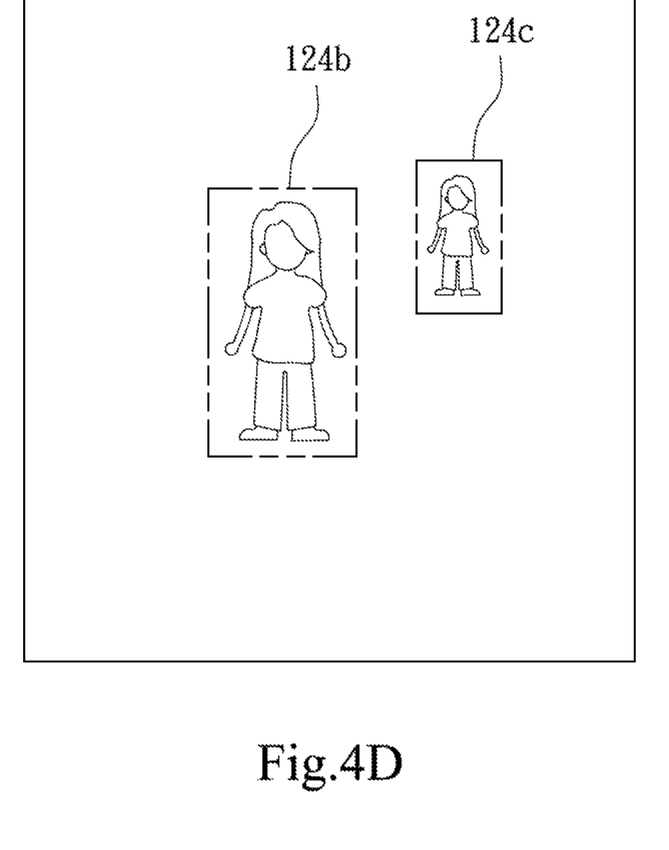

Then, each obstruction characteristic datum is multiplied by the corresponding classifier parameter, such as adding up the obstruction characteristic datum 9×(n/8)×(m/8) multiplied by the classifier parameter 9×(n/8)×(m/8) to obtain a result value. The result value is a score of the enclosed region. The score is larger than a floating threshold, which represents that the enclosed region has the obstructions detected. The score is not larger than the floating threshold, which represents that the enclosed region does not have any obstructions. As shown in FIG. 4D, the embodiment is exemplified by detecting pedestrians. As a result, the score of the enclosed region is larger than a floating threshold, which represents that the enclosed region has pedestrians as the obstructions detected, and the pedestrian images in the enclosed region are displayed, such as the obstruction images 124*b* and 124*c*. On the contrary, the score of the enclosed region is lower than a floating threshold, which represents that the enclosed region has the detected obstructions being not pedestrians. For example, the detected obstructions may be vehicles, roadblocks, other obstructions or nothing in this case. The classifier parameters and the floating threshold vary with different obstruction classification, so as to immediately adjust the classifier parameters and achieve the detection efficiency with more precision. The present invention is no longer limited to the problem with generating detection errors without adaptively adjusting the scene parameters and the classifier parameters in the traditional technology. On the other hand, the image processing units 142 calculate the scene parameters and the classifier parameters corresponding to the obstruction characteristic data to obtain a plurality of classification data, thereby enhancing recognition precision of the device. In conclusion, the traditional technology detects obstructions from images one by one, and sequentially deals with and classifies the obstructions. The operation amount of images is not only quite large but also requires much time. In addition, the operation amount is not easy to achieve real time determination. In order to cooperate with the AEB system that can rapidly and precisely determine braking timing, the present invention designs an adaptive device for classifying objects with parallel architecture and pipeline operation architecture, calculates a plurality of obstruction images in a one-by-one image processing way to improve the efficiency of performing statistics on vectors, and provides the obstruction data with more precision to the AEB system to avoid traffic accidents, thereby simplifying the complexity of processing images and time-consuming problems.

Moreover, in the traditional technology, classifier parameters are trained in advance and embedded in the AEB system. When a vehicle drives outdoors and meets with different scenes such as over-exposed scenes, night scenes, sunlit scenes or dusk scenes, misjudgment easily occurs and a detection rate is decreased since scene parameters cannot be adaptively adjusted and the classifier parameters cannot be adjusted according to different scenes. The present invention determines the scene corresponding to the images retrieved, flexibly adjusts classifier parameters in response to various scenes, and determines obstruction images with higher precision and classification thereof to solve the problem with misjudgment of a detection system in the traditional technology. Further, the present invention drags frames to enclose obstruction images and decides the range of the frames, and then processes the images according to the distances that the images are retrieved and sizes of the obstruction images, thereby improving the efficiency of processing images and solving the problem with a large operation amount caused by large ranges of images in the traditional technology.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. An adaptive method for classifying objects with parallel architecture storing a plurality of scene parameters and a plurality of classifier parameters, and said adaptive method for classifying objects with parallel architecture comprises steps of:
retrieving at least one image datum;
dragging frames to enclose a plurality of obstruction images of said image datum and deciding a frame range according to a range of each said obstruction image;
using a histogram of oriented gradient (HOG) algorithm to divide each said obstruction image into a plurality of small blocks and to perform statistics on nine characteristic vectors in each said small block, thereby obtaining said obstruction characteristic data of said obstruction images, and choosing and calculating said scene parameters and said classifier parameters corresponding to said obstruction characteristic data to obtain a plurality of classification data; and
determining whether said classification data is larger than a floating threshold corresponding to obstruction classification:
if yes, determining that said classification data belongs to said obstruction classification and outputting positions of enclosed said obstruction images; and
if no, determining that said classification data does not belong to said obstruction classification.

2. The adaptive method for classifying objects with parallel architecture of claim 1, further comprising a step of choosing a region of interest on said image datum and then dragging said frames to enclose said obstruction images in said region of interest on said image datum before said step of dragging said frames to enclose said obstruction images.

3. The adaptive method for classifying objects with parallel architecture of claim 2, further comprising a step of adjusting said frame range of each said obstruction image after said step of dragging said frames to enclose said obstruction images.

4. The adaptive method for classifying objects with parallel architecture of claim 1, wherein said HOG algorithm calculates edge values of each said obstruction image, and then calculates and adds up orientations and edge parameters of each pixel of each said small block to obtain said nine characteristic vectors.

5. The adaptive method for classifying objects with parallel architecture of claim 1, wherein said scene parameters comprise over-exposed scenes, night scenes, sunlit scenes or dusk scenes; and said classifier parameters comprise a plurality of oriented gradient characteristic parameters of different said obstruction classification.

6. The adaptive method for classifying objects with parallel architecture of claim 1, wherein each said classification datum is obtained by adding up each said obstruction characteristic datum multiplied by corresponding said classifier parameter.

7. The adaptive method for classifying objects with parallel architecture of claim 1, wherein said floating threshold varies according to different said obstruction classification and different said scene parameters.

8. An adaptive device for classifying objects with parallel architecture storing a plurality of scene parameters and a plurality of classifier parameters, and said adaptive device for classifying objects with parallel architecture comprises:
at least one image retriever comprising retrieving at least one image datum, dragging frames to enclose a plurality of obstruction images of said image datum and deciding a frame range according to a range of each said obstruction image; and
an image processor electrically connected with said image retriever, and said image processor uses a histogram of oriented gradient (HOG) algorithm to divide each said obstruction image into a plurality of small blocks and to perform statistics on nine characteristic vectors in each said small block, thereby obtaining said obstruction characteristic data of said obstruction images, and said image processor chooses and calculates said scene parameters and said classifier parameters corresponding to said obstruction characteristic data to obtain a plurality of classification data, compare said classification data with a floating threshold corresponding to obstruction classification and output positions of enclosed said obstruction images corresponding to said floating threshold.

9. The adaptive device for classifying objects with parallel architecture of claim 8, wherein said image retriever chooses a region of interest on said image datum and then drags said frames to enclose said obstruction images in said region of interest on said image datum.

10. The adaptive device for classifying objects with parallel architecture of claim 9, wherein said image processor adjusts said frame range of each said obstruction image according to a distance that said image retriever retrieves said image datum.

11. The adaptive device for classifying objects with parallel architecture of claim 8, wherein said scene parameters comprise over-exposed scenes, night scenes, sunlit scenes or dusk scenes; and said classifier parameters comprise a plurality of oriented gradient characteristic parameters of different said obstruction classification.

12. The adaptive device for classifying objects with parallel architecture of claim 8, wherein said floating threshold varies according to different said obstruction classification and different said scene parameters.

13. The adaptive device for classifying objects with parallel architecture of claim 8, wherein said image retriever and said image processor are built in an automatic emergency braking (AEB) system of a vehicle.

\* \* \* \* \*